(No Model.) 2 Sheets—Sheet 1.

W. A. SWIFT & W. E. MITCHELL.
CAM.

No. 497,835. Patented May 23, 1893.

Witnesses

Inventors
W. A. Swift
W. E. Mitchell
Attorney

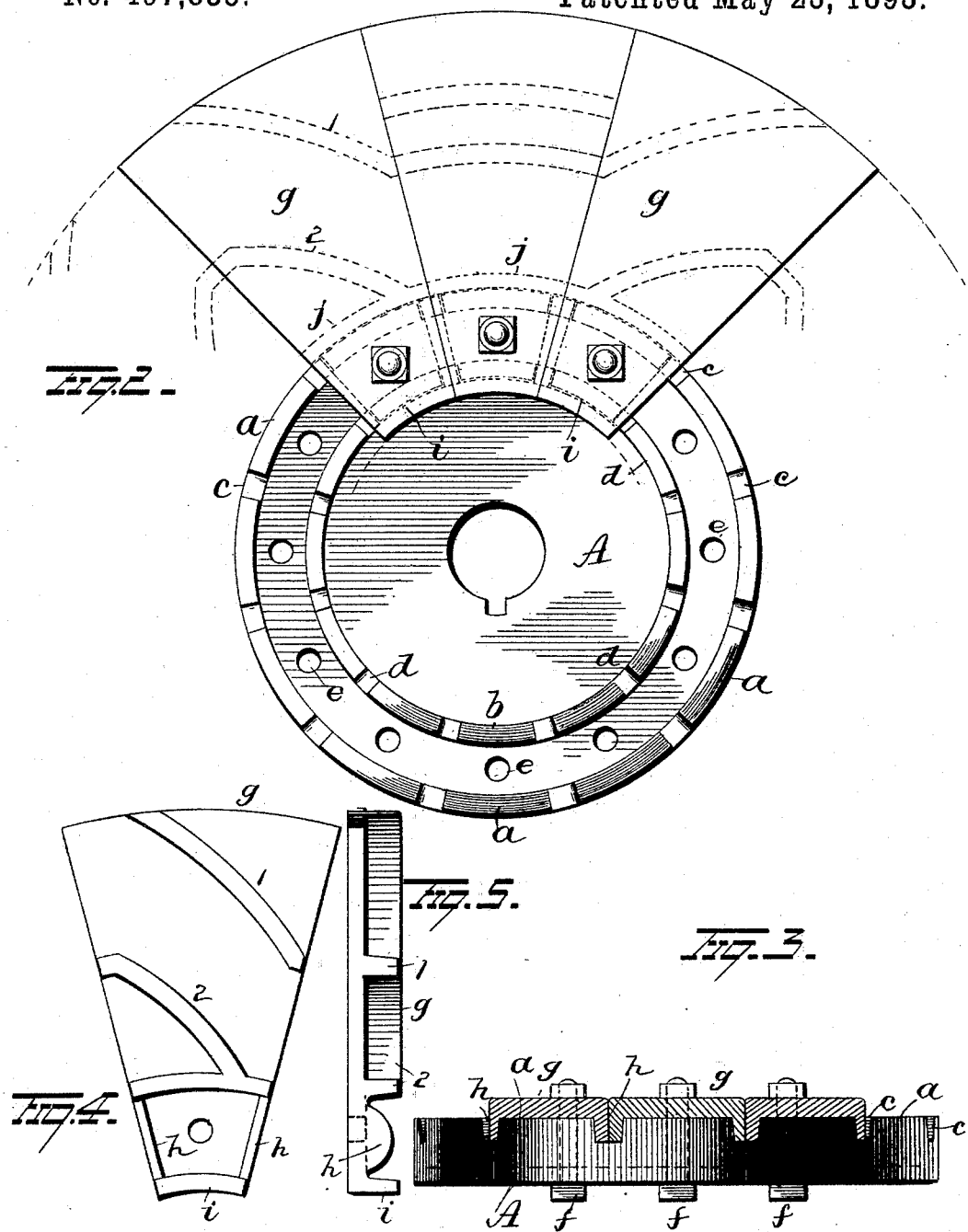

UNITED STATES PATENT OFFICE.

WILLIAM A. SWIFT AND WILFRED E. MITCHELL, OF COLUMBUS, GEORGIA.

CAM.

SPECIFICATION forming part of Letters Patent No. 497,835, dated May 23, 1893.

Application filed July 13, 1892. Serial No. 439,884. (No model.)

*To all whom it may concern:*

Be it known that we, WILLIAM A. SWIFT and WILFRED E. MITCHELL, residing at Columbus, in the county of Muscogee and State of Georgia, have invented certain new and useful Improvements in Cam-Plates for Weaving-Machines; and we do hereby declare the following to be a full, clear, and exact description of the invention, such as will enable others skilled in the art to which it appertains to make and use the same.

Our invention relates to an improvement in cam or pattern plates for weaving machines,—the object of the invention being to provide a cam plate for weaving machines made of a series of interchangeable or removable sections, which, when secured together, will produce a very solid and rigid plate.

A further object is to provide simple and efficient means for locking the sections of the plate together.

A further object is to produce a cam plate for weaving machines, which shall be simple in construction and effectual in the performance of its functions.

With these objects in view the invention consists in certain novel features of construction and combinations and arrangements of parts as hereinafter set forth and pointed out in the claims.

Figure 1:
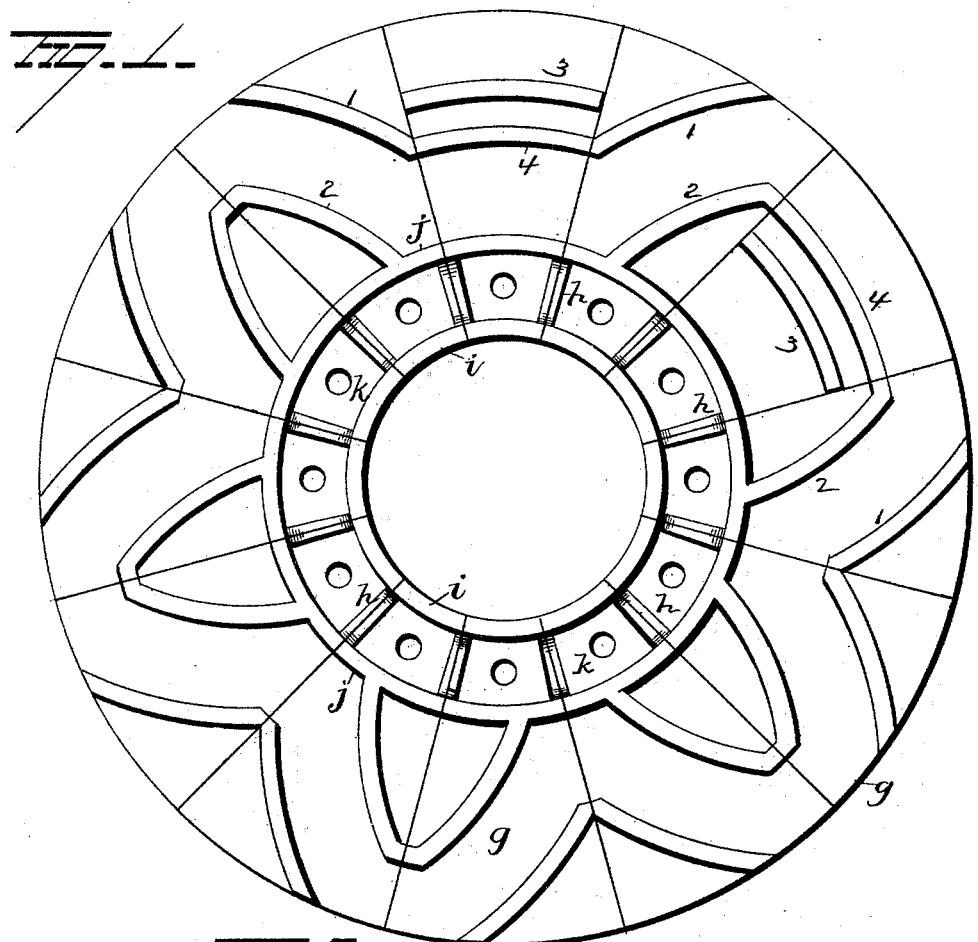

In the accompanying drawings: Figure 1 is a face view of our improved cam plate. Fig. 2 is a face view of the locking plate. Fig. 3 is an edge view of the device. Figs. 4, 5, 6 and 7 are detail views.

Figure 6:
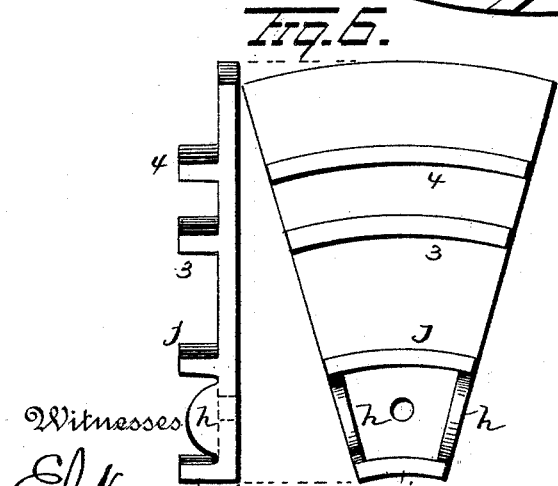
Figure 7:
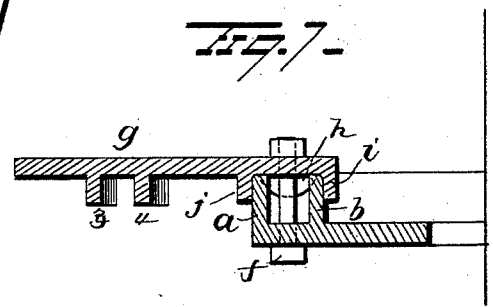

A represents the locking plate, provided at its center with a perforation for the accommodation of a shaft or other supporting device. At the periphery of the plate A is an annular flange $a$, and at a point removed somewhat inwardly from the flange $a$ is a concentric annular flange $b$. The flange $a$ is made with a series of recesses $c$, and the flange $b$ is made with a series of recesses $d$ adapted to align radially with the recesses $c$ of the flange $a$. Between the flanges $a$, $b$, and intermediate of the recesses $c$, $d$, the plate is provided with perforations $e$ for the accommodation of bolts $f$, whereby to secure the sections $g$ of the cam plate, to the locking plate A. Each cam section $g$ is made V-shaped and provided on one face with flanges 1, 2, which form part of the cam or pattern to be employed. Each section $g$ is provided at opposite edges in proximity to its smaller end, with flanges $h$, (which are preferably curved as shown in Figs. 5 and 6,) said flanges being adapted to enter and partially fill adjacent recesses $c$, $d$, in the flanges $a$, $b$. Each recess $c$, $d$, is made of a length about equal to double the thickness of one of the flanges $h$ of the sections $g$, so that a flange $h$ of two sections will be located in each recess $c$, $d$. Each plate or section $g$ is also provided with a curved flange $i$ at the inner extremity of the flanges $h$, and is adapted to lie against the inner face of the annular flange $b$,—while a flange $j$ at the outer extremity of the section is adapted to lie against the outer annular flange $a$. By this means the sections of the plate will be effectually prevented from moving up or down or sidewise. The sections are provided with perforations $k$ for the accommodation of the bolts $f$, whereby to firmly lock the sections to the plate A. Any number of sections may be employed from two to twelve or more. The cam plates may be readily and quickly removed and replaced by others when it is desired to change the cam or pattern. One or more of the sections will be provided with two parallel flanges 3, 4, which, by using one with a right section of the device can be used as a raiser or lowerer for the harness, as will be clearly understood by reference to Fig. 1.

The device is very simple in construction and effectual in the performance of its functions.

Having fully described our invention, what we claim as new, and desire to secure by Letters Patent, is—

1. The combination with a locking plate having circular flanges concentric with the center thereof, of removable cam sections provided with flanges adapted to bear on the locking plate flanges, the locking plate and the sections having holes between the flanges thereof respectively, said holes adapted to receive fastening devices whereby the sections are held upon the locking plate, substantially as set forth.

2. The combination with a locking plate provided with concentric flanges said flanges having aligned radial notches, of removable cam sections provided with curved parallel flanges adapted to engage the concentric flanges of the locking plate, and connecting flanges extending between the curved flanges and located at the edges of the cam sections in position to enter the aligned radial notches in the concentric flanges of the locking plate, and means for securing the cam section on the locking plate, substantially as set forth.

In testimony whereof we have signed this specification in the presence of two subscribing witnesses.

WILLIAM A. SWIFT.
WILFRED E. MITCHELL.

Witnesses:
A. A. WILLCOX,
C. M. WOOLFALK.